United States Patent [19]

Schommartz et al.

[11] Patent Number: 4,973,347
[45] Date of Patent: Nov. 27, 1990

[54] APPARATUS FOR COOLING OF A MOLD OF AN IS MACHINE OR AN RIS MACHINE FOR PRODUCING HOLLOW GLASS ARTICLES

[75] Inventors: Peter Schommartz, Essen; Joachim Wolter, Gladbeck, both of Fed. Rep. of Germany

[73] Assignee: Ruhrglas GmbH, Essen, Fed. Rep. of Germany

[21] Appl. No.: 428,292

[22] Filed: Oct. 27, 1989

[30] Foreign Application Priority Data

Nov. 3, 1988 [DE] Fed. Rep. of Germany ....... 3837335

[51] Int. Cl.$^5$ ............................................. C03B 9/20
[52] U.S. Cl. ........................................ 65/267; 65/317; 65/172; 65/356; 65/374.1
[58] Field of Search ................. 65/265, 267, 319, 356, 65/172, 374.1

[56] References Cited

U.S. PATENT DOCUMENTS

| | | | |
|---|---|---|---|
| 2,811,815 | 11/1957 | Eldred | 65/356 X |
| 3,314,775 | 4/1967 | Shetler et al. | 65/319 X |
| 3,337,325 | 8/1967 | Bittner et al. | 65/172 X |
| 4,579,576 | 4/1986 | Jones | 65/356 X |
| 4,608,075 | 8/1986 | Trahan et al. | 65/172 X |

FOREIGN PATENT DOCUMENTS 0153801  1/1988  European Pat. Off. .

*Primary Examiner*—Robert L. Lindsay
*Attorney, Agent, or Firm*—Herbert Dubno

[57] ABSTRACT

A cooling apparatus for one or more molds on an IS or RIS machine for the production of hollow-glass articles has a cooling chamber below the or each mold subdivided into upper and lower parts at a horizontal planar point with the upper part being detachable from the lower part to allow replacement. The suction pipe can extend through the upper part and form a unit therewith. A valve plate can engage the intake opening of the chamber from its underside and can be displaced by a piston guided in a cylinder housing on both axial sides of that piston.

20 Claims, 2 Drawing Sheets

4,973,347

APPARATUS FOR COOLING OF A MOLD OF AN IS MACHINE OR AN RIS MACHINE FOR PRODUCING HOLLOW GLASS ARTICLES

Field of the Invention

Our present invention relates to an apparatus for the cooling of a mold or form or a plurality of molds or forms of an IS machine or an RIS machine for the production of hollow glass articles. More particularly, the invention relates to this type of apparatus in which each mold has a chamber for the cooling air at an input side of which a controlled valve is provided to determine the flow cross section of an inlet opening to this chamber and the connection of the chamber through this opening with a cooling air duct, while the air outlet from the chamber, when the form or mold is closed, communicates with axial cooling passages in the mold.

Background of the Invention

A cooling apparatus of the aforedescribed type is known from the European Patent Publication EP 0 15 3 801 B1.

In this known cooling apparatus for the finishing molds of an IS machine, the collecting chambers for the cooling air of a double gob machine, together with the cooling air supply duct in which the control valves are provided, are arranged in a bracket of the machine and the entire chamber structures form a one piece unit with the air supply and the structure containing the control valves.

This system has the drawback that, should repair of the system be necessary, the entire unit must be removed, thereby resulting in relatively long downtimes for the entire machine.

Furthermore, the manipulation for repair purposes is relatively complex because of the massive unit which must be removed.

Objects of the Invention

The principal object of the present invention is to provide an apparatus, in an IS or RIS machine for the production of hollow glass articles, which can avoid the above mentioned drawback and provide an effective cooling of the mold or molds.

Another object of this invention is to provide, in an IS machine or an RIS machine for the production of hollow glass articles, an improved cooling system which does not require removal of the entire cooling unit including the air supply duct and the control valve assembly, in the event that repair becomes necessary.

Summary of the Invention

These objects are attained, in accordance with the present invention by providing the cooling air chamber or the cooling air chambers so that they are subdivided in a horizontal plane and so that upper and lower parts of the chamber or chambers are releasably or detachably connected together.

With this construction, at least the upper parts of the chambers of a plurality of molds of each station of the machine can form a structural unit which can be detached from the lower parts and removed to afford access to both parts for repair.

This has the advantage that the upper part or the unit forming the upper parts of a plurality of chambers, with associated structural elements can be easily and rapidly removed from the lower part or parts and, for example, can be replaced by a new corresponding unit to restore the machine to operation in a relatively short time.

It has been found to be advantageous to apply the invention to the cooling of the finish mold or finish molds of an IS machine or RIS machine in which the cooling air chamber or cooling air chambers can be mounted on a bracket of the machine and the chamber or chambers is traversed by a vacuum pipe or vacuum pipes extending from the bottom or bottoms of the molds to the exterior. Suction pipes of this type are known for use in generating a suction or subatmospheric pressure within the finish molds.

In that case, according to the invention, the suction pipe or pipes, at least with respect to the portions thereof extending from the bottom or bottoms of the mold or molds to the exterior, form a unit with the upper part or parts of the chamber or chambers which can be removed at the horizontal point between the chamber parts, from the lower part.

According to another feature of the invention the vacuum pipe or pipes which extend through the chamber or chambers are constructed and arranged to plug into or onto a fitting mounted on the lower part or parts when the upper chamber part is assembled on the lower chamber part or, conversely, the pipe joint can be unplugged when the upper part is separated from the lower part.

Because the suction pipe or pipes are mounted on the unit forming the upper part of the chamber or chambers, in the event blockages occur in a vacuum pipe, the entire upper part including the associated suction pipe or pipes can be replaced by a new upper part where the unit including that upper part and suction pipe.

Because of the plug-in connection described, this replacement also can be effected in a comparatively short time.

In conventional cooling systems of the type which were previously described, the intake opening had a conical convergence between the cooling air duct and the chamber and was closed by a complementarily shaped closing member of the valve. The result was a conical valve seat that had the disadvantage that it easily could be jammed so that the valve remained suspended from the seat and, consequently, the requisite cooling could not occur at the appropriate time or rate. The result was poor quality or defective articles as fabricated by the machine.

To avoid this drawback, the present invention provides that the intake openings of the or each chamber is provided with a rim and that the or each valve has, as its closure member, a closure plate which, in the closed position of the valve, rests against the lower edge of the intake opening.

In this manner, a flat contact of the closing plate on the lower rim of the intake opening is ensured so that binding of the valve is reliably excluded and any slight unevenness can be readily compensated.

In conventional cooling devices, moreover, valves are used whose shafts are surrounded by compression springs which project into the piston at one end and are received in cylinder housings which are pressurizable by a fluid medium. As a result, the piston is guided in the cylinder only where the piston rod extends through the cylinder and is provided with the closure member. It has been discovered in practice that this one sided guidance of the piston rod is highly disadvantageous since a canting of the valve can occur or some other guidance failure can interfere with operation of the valve and can lead to insufficient cooling of the associated finish mold.

To avoid this drawback, according to a further feature of the invention, the valve shaft extends through the piston or the piston is provided with a piston rod extending axially on opposite sides of the body of the piston with both sides of the piston rod being guided in the cylinder housing.

The result is a two sided guidance of the piston which ensures a precise movement of the valve in a highly reliable fashion.

As a consequence, the finish molds can be cooled to the desired degree and production of high quality glass articles at a high rate can be assured without problems resulting from valve failure.

Advantageously, the piston and cylinder arrangement is a double acting piston and cylinder arrangement which does not require a spring but has the piston pressurized by the fluid medium, i.e. for valve closure and valve opening.

Effective sliding of the piston and thus a high responsiveness of the valve can be achieved by fitting the piston with piston rings composed of polytetrafluoroethylene.

Brief Description of the Drawing

The above and other objects, features and advantages of my invention will become more readily apparent from the following description, reference being made to the accompanying highly diagrammatic drawings in which.

Specific Description

Figure 1:
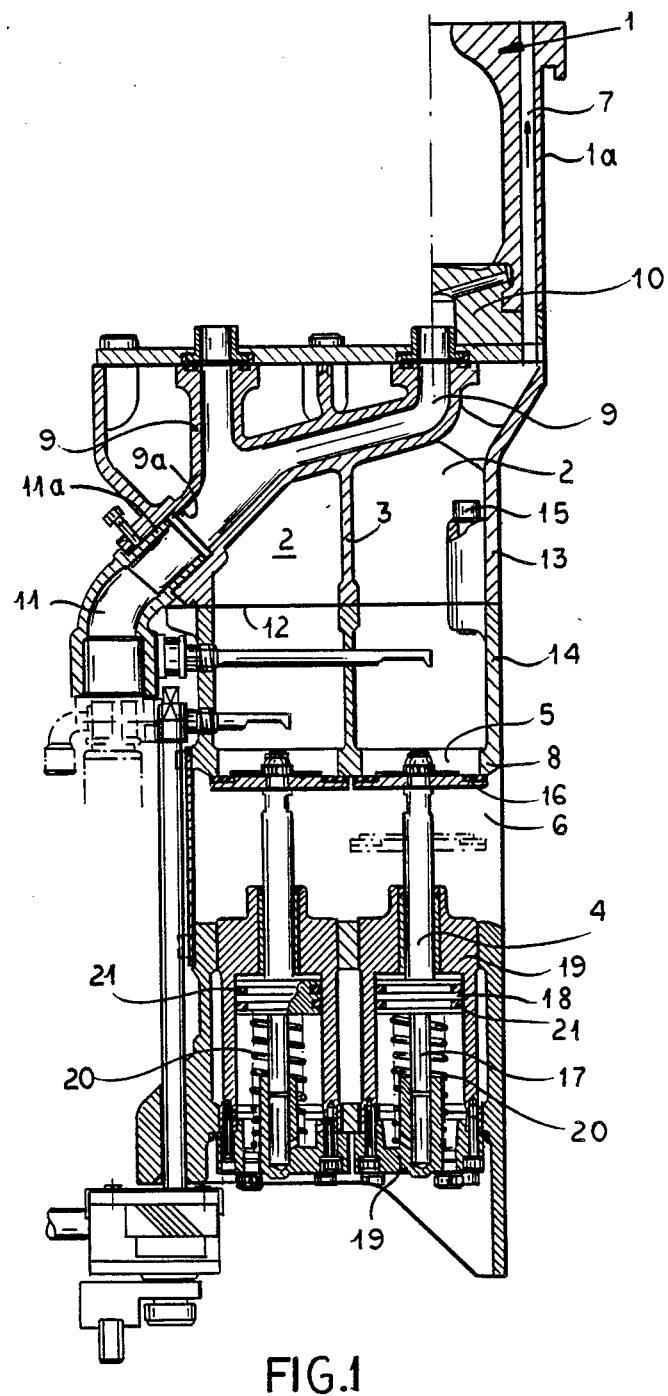
FIG. 1 is a partial cross section through a double mold station of the finish mold side of an IS machine equipped with cooling apparatus according to the invention seen from the side and showing only part of one of the finish molds of a double gob machine.

In FIG. 1 one can see a partly illustrated mold 1 of a double station at the finish mold side of an IS machine.

The mold 1 comprises two mold parts 1a and 10 which are shown in the closed position.

The molds 1 are provided in the usual manner above two neighboring air chambers 2 separated from one another by the partition 3. At their intake sides, the chambers 2 are provided with intake openings 5 communicating with a cooling air duct 6 which can be closed or opened by a control valve 4.

At their discharge sides, each of the chambers 2 can communicate with the axial cooling passages 7 in the molds when the latter are in the closed position.

The chambers 2 are provided on a bracket 8 of the machine.

The chambers 2 are traversed by suction pipes 9 which extend to the bottoms 10 of the molds 1 and from these bottoms, outwardly to a common pipe fitting 11. The latter is connected externally of the bracket 8 to a suction source not shown. As indicated in FIG. 1, moreover, the common pipe fitting 11 may have an end 11a which plugs into a socket 9a formed by the pipes 9 and constituting part of a single unit with the upper parts of the chambers as will be described. The pipe fitting 11 can be mounted on a lower part of the chambers, so that when the upper part is fitted onto the lower part, the plug and socket connection is formed to communicate suction to the molds.

The means for mounting the assembly on the balance of the machine, the system for monitoring cooling air flow and the like, partially illustrated, have not been designated by reference numerals since they are conventional in the art and not the subject of this invention.

The cooling air chambers 2 are subdivided at a horizontal plane to form a joint 12 in this plane and define the upper part 13 above the plane and a lower part 14 below the plane.

The upper part 13 forms an upper unit which is constituted in one piece with the pipes 9 and the upper portions of the chambers 2, whereas the lower portions of the chambers 2 form a lower part as a lower unit.

The upper and lower units 13 and 14 are connected together e.g. with threaded bolts 15 or the like.

Upon the occurrence of a stoppage in the passages of the suction pipe 9, by releasing the bolts 15 we are able to remove the upper unit 13 consisting of the upper parts of both chambers and the suction pipes and rapidly and easily replace it with a new unit including the suction pipes 9 so that the operation of the station can be restored in a very short period of time.

It is for this reason that the plug portion 11a of fitting 11 can engage in a wall of the upper part forming an end of the pipes 9.

The intake openings 5 of the chambers 2, which are cylindrical, have rims lying in a horizontal plane and engageable by respective closure plates 16 so that these closure plates, in a closed position of each valve, come to lie on the lower rims or edges of these intake openings. The closure plates 16 thus seal the intake openings from below against the respective edges, thereby preventing any jamming of the closure plates of the valves 4 against the respective seats.

The valve shafts of the valves 4 are formed as piston rods 17 extending axially from the respective pistons 18 in opposite directions and guided in the cylinder housing 19 on both sides of each piston 18.

Figure 2:
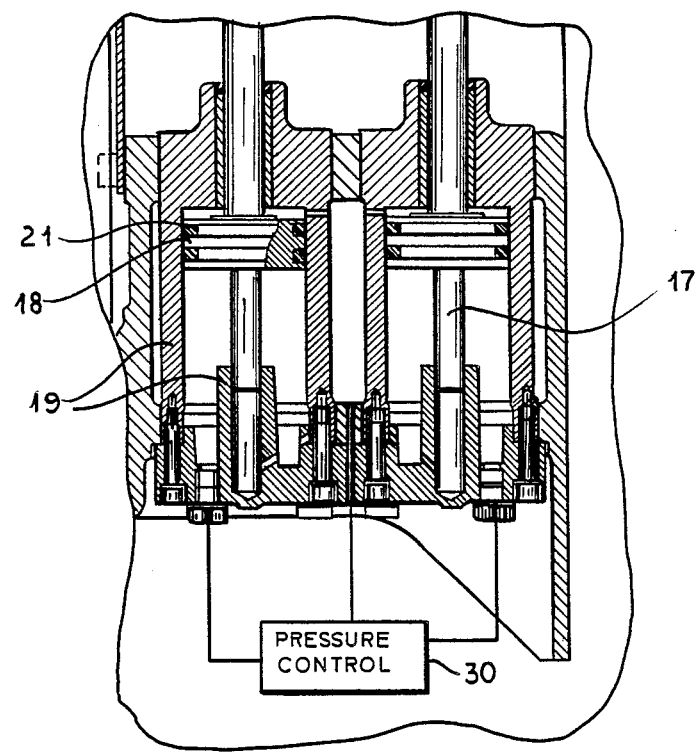
FIG. 2 is a cross sectional view through the piston and cylinder arrangement for controlling the valves of such a machine in accordance with another embodiment of the invention.
Figure 3:
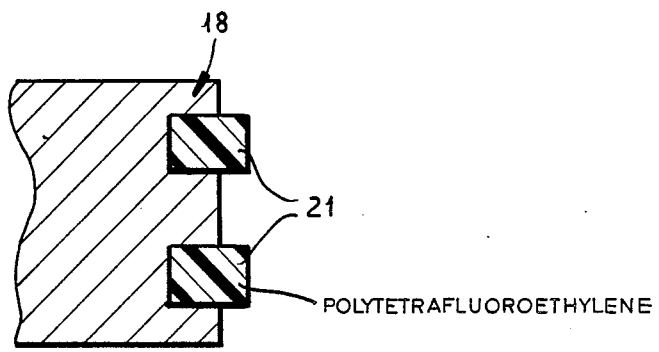
FIG. 3 is a detail cross section of the piston according to the invention.

In the embodiment of FIG. 1, coil springs 20 are provided to displace the pistons in an opposite direction from the direction in which the cylinders are pressurized, i.e. so called single acting cylinders are used which are pressurized from one side. As can be seen from FIG. 2, however, it is possible to omit such springs and to provide the fluid pressure control 30 so that it feeds the pressurizable medium to each cylinder on both sides of the respective piston 18 and thereby constitute these pistons as double acting pistons.

The piston rings 21 of these pistons are preferably constituted of polytetrafluoroethylene so that they provide a low friction engagement on the cylinder. With such rings friction can be greatly reduced while the valves are assured of reliable sliding characteristics.

Of course the invention is not limited to the double gob machine described and illustrated but is applicable to three gob, four gob and other machines and of course can be applied to single gob machines as well.

We claim:

1. A cooling apparatus for an IS or RIS machine for the production of hollow glass articles, comprising:
    at least one mold having axial cooling air passages;
    means below said mold forming at least one cooling air chamber communicating with said cooling air passages at an outlet side of said chamber, said chamber having an intake opening at a lower portion thereof;

at least one controlled valve disposed below said chamber and actuatable to selectively open and close said opening; and means forming a cooling air duct communicating with said intake opening below said chamber, said cooling air chamber being subdivided in a horizontal plane to form a joint between an upper part of said chamber and a lower part of said chamber and being provided with means detachably connecting said upper part to said lower part.

2. The apparatus defined in claim 1 wherein said machine is provided with a plurality of said molds at a station and each of said molds is formed with a respective said chamber, upper parts of all of said chambers forming a common unit detachable from lower parts of all of said chambers.

3. The apparatus defined in claim 1, further comprising a suction pipe communicating with said mold at a bottom thereof and extending through said upper part of said chamber.

4. The apparatus as defined in claim 3 wherein said suction pipe forms one piece with said upper part of said chamber and extends to an exterior thereof for connection with a suction source.

5. The apparatus as defined in claim 1 wherein said intake opening is formed with a generally planar lower rim and said valve comprises a valve plate engageable against said lower rim from below.

6. The apparatus as defined in claim 5 wherein said valve has a valve piston and a valve rod extending to said closure plate on one side of said piston and extending from said piston axially on an opposite side thereof, a cylinder housing receiving said piston, and means in said housing for guiding said rod on two axially opposite sides of said piston.

7. The apparatus as defined in claim 6 further comprising means for pressurizing a cylinder formed in said housing around said piston on opposite sides of said piston to displace said piston in said housing.

8. The apparatus as defined in claim 7 wherein said piston is provided with polytetrafluoroethylene piston rings guiding said piston on said cylinder.

9. The apparatus defined in claim 1 wherein said said valve is provided with a piston slidably displaceable in a cylinder formed by a cylinder housing.

10. The apparatus as defined in claim 9 wherein said piston has polytetrafluoroethylene piston rings slidably engaging said cylinder.

11. The apparatus as defined in claim 9 wherein said piston has a piston rod extending in opposite axial directions therefrom and said housing is provided with means for slidably guiding said rod on opposite axial slides of said piston.

12. A cooling apparatus for an IS or RIS machine for the production of hollow glass articles, comprising:

at least one mold having axial cooling air passages;

means below said mold forming at least one cooling air chamber communicating with said cooling air passages at an outlet side of said chamber, said chamber having an intake opening at a lower portion thereof;

at least one controlled valve disposed below said chamber and actuatable to selectively open and close said opening; and means forming a cooling air duct communicating with said intake opening below said chamber, said chamber having an upper part thereof traversed by a suction pipe communicating with a bottom of said mold and extending through said upper part to open externally of said chamber for connection to a suction source.

13. A cooling apparatus for an IS or RIS machine for the production of hollow glass articles, comprising:

at least one mold having axial cooling air passages;

means below said mold forming at least one cooling air chamber communicating with said cooling air passages at an outlet side of said chamber, said chamber having an intake opening at a lower portion thereof;

at least one controlled valve disposed below said chamber and actuatable to selectively open and close said opening; and means forming a cooling air duct communicating with said intake opening below said chamber, said intake opening having a lower rim lying in a plane and said valve having a closure plate engageable from below against said lower rim.

14. The apparatus defined in claim 13 wherein said valve is provided with a piston slidably displaceable in a cylinder formed by a cylinder housing.

15. The apparatus as defined in claim 14 wherein said piston has polytetrafluoroethylene piston rings slidably engaging s id cylinder.

16. The apparatus as defined in claim 14 wherein said piston has a piston rod extending in opposite axial directions therefrom and said housing is provided with means for slidably guiding said rod on opposite axial slides of said piston.

17. A cooling apparatus for an IS or RIS machine for the production of hollow glass articles, comprising:

at least one mold having axial cooling air passages;

means below said mold forming at least one cooling air chamber communicating with said cooling air passages at an outlet side of said chamber, said chamber having an intake opening at a lower portion thereof;

at least one controlled valve disposed below said chamber and actuatable to selectively open and close said opening; and means forming a cooling air duct communicating with said intake opening below said chamber, said valve being formed with a piston guided in a cylinder of a cylinder housing and having a piston rod extending axially from said piston in opposition directions, said housing being provided with means guiding said rod on opposite axial sides of said piston.

18. The apparatus as defined in claim 17 further comprising means for pressurizing said cylinder on opposite axial sides of said piston.

19. The apparatus as defined in claim 18 wherein said piston is provided with polytetrafluoroethylene piston rings slidably engaging said cylinder.

20. The apparatus as defined in claim 17 wherein said piston is provided with polytetrafluoroethylene piston rings slidably engaging said cylinder.

* * * * *